March 3, 1959      A. HARDY      2,875,700
AUTOMATIC TRANSMISSION PUMP
Filed May 4, 1955      2 Sheets-Sheet 1
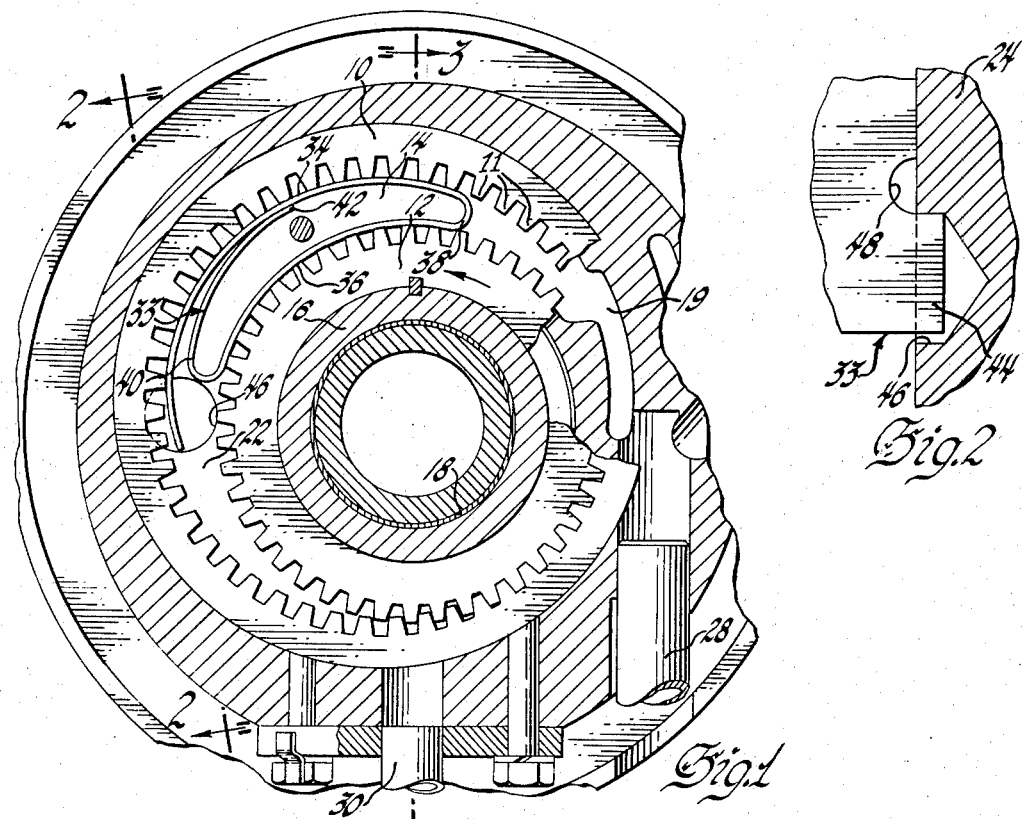
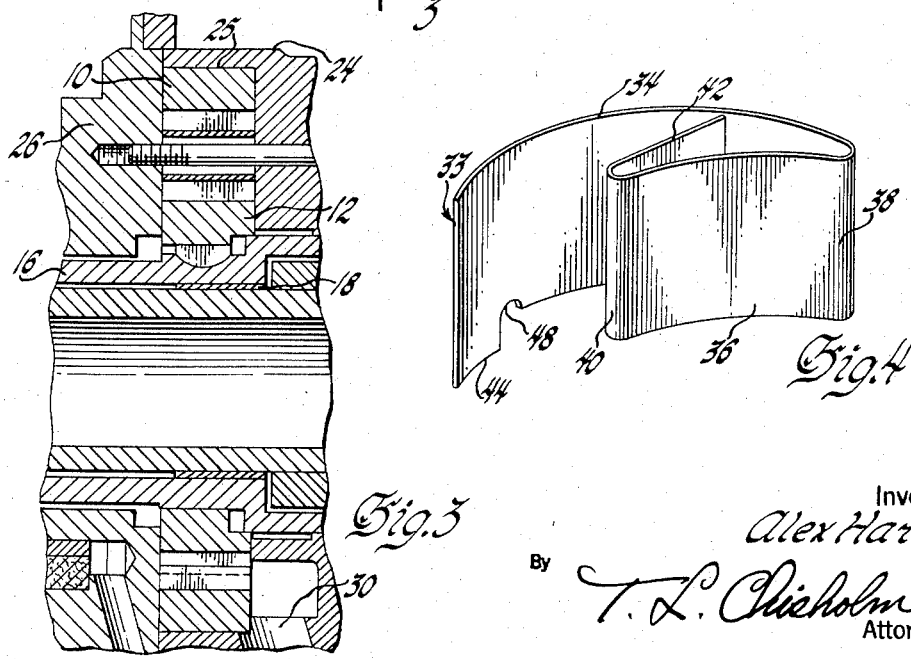
Inventor
Alex Hardy
By T. L. Chisholm
Attorney March 3, 1959   A. HARDY   2,875,700
AUTOMATIC TRANSMISSION PUMP
Filed May 4, 1955   2 Sheets-Sheet 2
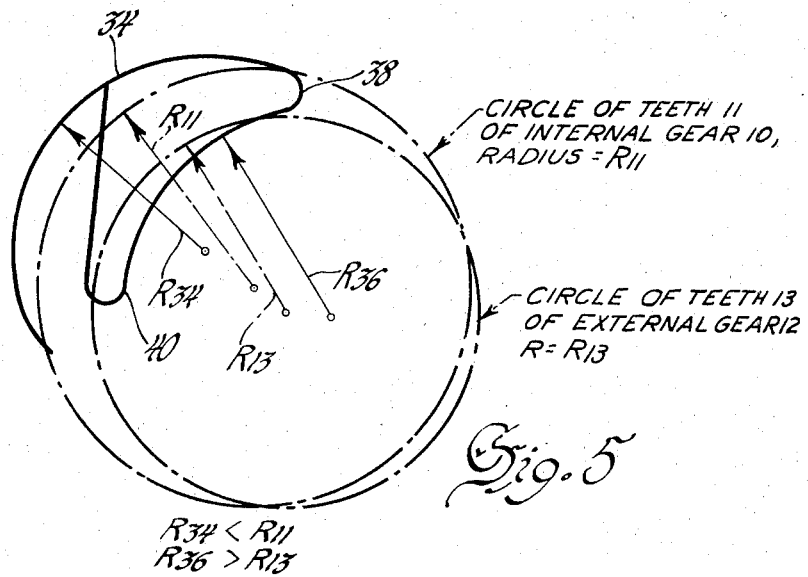
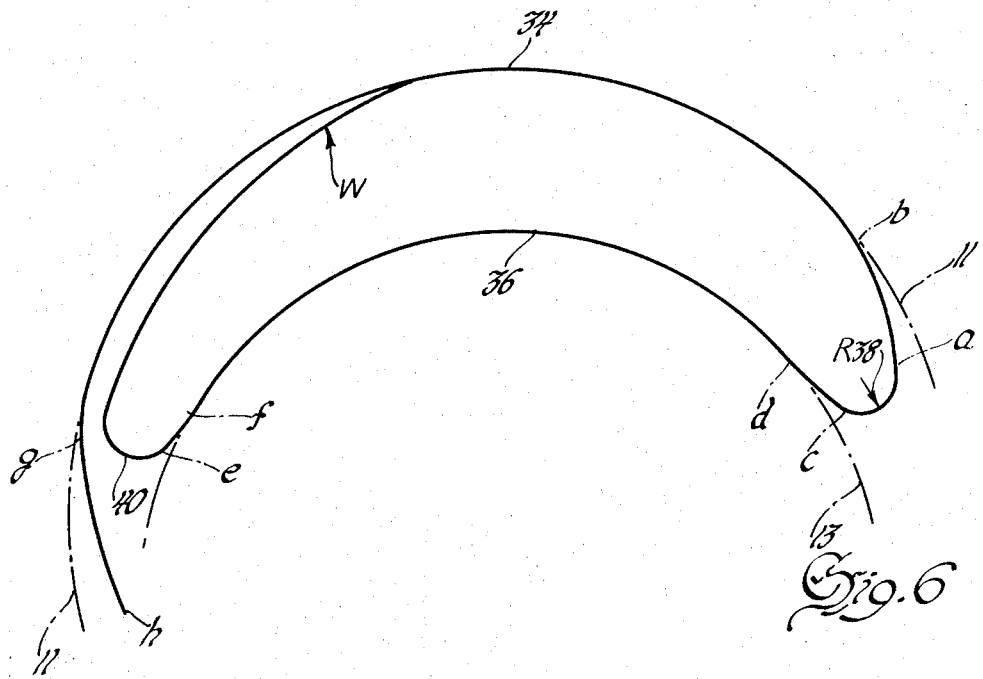
INVENTOR
Alex Hardy
BY T. L. Chisholm
ATTORNEY United States Patent Office 2,875,700
Patented Mar. 3, 1959

2,875,700
AUTOMATIC TRANSMISSION PUMP

Alex Hardy, Detroit, Mich., assignor to General Motors Corporation, Detroit, Mich., a corporation of Delaware Application May 4, 1955, Serial No. 505,911

8 Claims. (Cl. 103—126)

This invention relates to pumps, especially to pumps suitable for automatic transmissions for automobiles and designed to maintain a supply of oil under pressure for operating hydraulic controls and for lubrication, an example of such transmission being shown in the patent to Scheiter 2,671,359.

It is customary to make pumps in which a pair of members having spaced projections like gear teeth, rotate in mesh with one another. It is endeavored to have the projections or teeth move in contact with a stationary partition between intake and delivery chambers so that the teeth and partition form fluid-carrying pockets which deliver fluid from the low pressure intake chamber to a high pressure delivery chamber. Examples of such pumps are shown in the Scheiter patent referred to and in the Ellis Patent 2,544,144.

Such known pumps that have come to my knowledge, while satisfactory for many purposes, have the disadvantage that it is difficult to effect or maintain sealing contact between the moving projections and the stationary partitions. For example, the exact size or location of the members may vary from specimen to specimen in mass production, and a single specimen, once assembled to have good contact, may wear and so reduce its efficiency or sealing effectiveness.

It is among the objects of the invention to provide an improved construction of pump which has improved efficiency, reduced leakage and improved fit of parts, which advantages are obtained in spite of unavoidable variations in manufacture and maintained in spite of wear in use.

Other objects and advantages will be apparent in the accompanying description, and in the drawings, in which Fig. 1 is a cross section, partly diagrammatic, of a pump embodying one form of the invention.

Fig. 2 is a section on the line 2—2 of Fig. 1;

Fig. 3 is a section on the line 3—3 of Fig. 1;

Fig. 4 is a perspective view of a resilient partition forming part of the pump,

Fig. 5 is a diagram of the relationship of a spring partition in respose to the circles of the pump gear, and Fig. 6 is an enlarged diagram showing the relationship of the gear circles and the curvatures of various parts of the spring when assembled with the gears.

The pump illustrated by way of example has a rotary annular member 10 having spaced internal projections or teeth 11, and a second rotary member 12 located eccentrically within the annular member 10 and having teeth 13 meshing with the teeth 11. The members 10 and 12 are usually, but not necessarily, conventional gears. I use the term gear herein in a somewhat broader sense to denote any rotatable member having spaced projections which are adapted to be positioned between corresponding projections of a second rotary member in such manner that the members always rotate together. In this arrangement one may rotate the other. Likewise, I use the terms tooth and teeth to refer to the projections on such rotary members.

In Fig. 1, 10 may be called an annular or internal gear because the teeth project internally from its rim, while the member 12 is called an external gear because the teeth project externally from the body. The gears provide or define a generally crescent-shaped pumping space 14 between the gears. The external gear 12 is keyed to a shaft 16 mounted in any suitable bearing 18. The gear 12 is preferably rotated in the direction of the arrow in Fig. 1 and drives the gear 10. It is customary to provide a crescent-shaped partition, for example, as disclosed in the Scheiter patent, which separates the pumping space 14 into an intake or suction chamber 19 and a pressure discharge chamber 22. The gears are mounted in a circular chamber in a pump body 24 which forms a bearing 25 for the internal gear 10. A cover plate 26 encloses the gears and completes the pump chamber. Any suitable intake conduit 28 supplies oil to the intake chamber 18 and any suitable delivery conduit 30 is connected to the pressure discharge chamber 22.

As so far described the construction of the pump is well known. In such pumps the crescent partition has been rigid and fixed, frequently being formed integral with the pump body or cover. This has led to loss of efficiency and leakage caused by failure of the teeth of the gears to fit the crescent accurately in any one specimen or consistently from specimen to specimen, or constantly over a period of time. For example, in quantity production there are slight but unavoidable variations in the diameter of the circles forming the ends of the gear teeth, variations in eccentricity of mounting the gears, variations in forming and locating the surfaces of the crescent and so on. In a manufacturing program allowances or tolerances must be made so that the gears will turn freely in spite of these unavoidable variations. This results in some specimens having a poor fit between the crescent and the teeth of one gear, or both. This makes the pump leak, reduces its efficiency and reduces the pressure it can maintain. Also, wear during use may produce the same results in a pump in which the parts initially fitted well.

It is an object of this invention to overcome these disadvantages, for example by the resilient and floating partition 33 shown in Figs. 1 and 3.

I may form a thin, flexible elastic strip, e. g., spring steel, into the shape shown in Fig. 4. When so formed it embodies one flexible and elastic or resilient arcuate member 34 which is to fit the ends of the teeth of the internal gear 10 and a second flexible and elastic or resilient arcuate member 36 which is to fit the other gear. The members 34 and 36 are connected by a bend 38 which forms both a pivot or hinge connecting 34 and 36 and a spring which constantly urges the arcuate members to rotate away from each other. A second resilient hinge 40 connects the free end of arcuate member 38 with a portion 42 forming a leaf spring, the free end of which bears against the arcuate member 34 between its ends. The curvature of the arcuate members may fit the gears as accurately as manufacturing processes permit. However, slight variations in manufacture may make it desirable to form each arcuate member slightly more or less curved than the cylindrical surface it is to fit and bend them to fit resiliently when the pump is assembled. In such arrangement, as shown in Fig. 5, the member 34, in repose, will lie in a cylindrical surface having greater curvature than that of the cylinder determined by the ends of the teeth of the internal gear. Thus, if the member 34 is curved in a circular cylinder the radius $R_{34}$ of that cylinder will be less than the radius $R_{11}$ of the cylinder determined by the ends of the teeth of the internal gear. On the other hand, the member 36 will be flatter than the cylinder of the external gear by having a curvature less than that of the cylinder determined by the ends of the teeth of gear 12. That is, if the member 36 is curved into a circular cylinder its radius $R_{36}$ will be greater than the radius $R_{13}$ of the cylinder formed by the ends of the teeth of the external gear.

When the partition is placed between the gears, the center of the curved member 34 will tend to contact the internal gear 10 while the ends are held free by the inherent curvature and resilience of the member 34. The hinge 38 and the end of the leaf spring 42 constitute means acting at separated points to urge the member 34, or at least a substantial portion of its length, into conformity with the internal gear 10. Likewise the center of the member 36 tends to contact the external gear 12 while its ends are held away from that gear by the inherent resilience and curvature of the portion 36. The two folds or hinges 38 and 40, together with the spring leaf 42 wrap the curved member 36 resiliently and accurately around the outside of gear 12. This tends to compensate for variations in size of the gears or in curvature of the arcuate members. Preferably, the hinge 38 is formed so that when the bend 38 is placed between the gears it normally tends to position the curved portion 36 entirely within the circle formed by the ends of the teeth of gear 12, as shown in Fig. 5. This tends to compensate for variations in the eccentricity of the gears. Preferably also, the hinge 40 is so formed that the free end of the spring leaf 42 tends to lie outside the circle formed by the ends of the teeth of gear 10 with the spring in the position shown in Fig. 5. This allows the spring 42 to exert enough force on arcuate member 34 to conform it accurately to the curvature of gear 10 and to maintain the arcuate member accurately in contact with gear 12 throughout at least a substantial portion of its length.

The opening between the members 34 and 36 opposite hinge 38 faces the high pressure or discharge chamber so that the fluid under pressure in the delivery chamber will act as resilient means constantly assisting in seating the members 34 and 36 against the gears. It can do this both by urging the members 34, 36 to rotate apart about the pivot 38 and by conforming the curvature of the flexible members to the curvature of the gears. However, it is desirable to construct the pump so that the gears may be rotated in either direction, although it may be preferable to rotate them in one direction. Consequently, the free end of the member 34 is bent away from the gear 10, as shown in Fig. 1 and at $g$—$h$ in Fig. 6. Then if the pump is arranged to rotate in the opposite direction the teeth 11 do not strike the end of the member 34.

It is important to prevent undue wear of the spring that the teeth always strike the spring at a low angle and at a point where the spring is free to bend away from the teeth without unduly high resistance. To this end the hinge 38 is formed, as shown in Fig. 6, on a radius $R_{38}$ which is less than half the distance between the gear teeth at the place where the hinge is to go, and the hinge is joined to the main portions of the members 34 and 36 (which are in contact with the gears) by portions $ab$ and $cd$ which are out of contact with the gears and join the circles of the gears at low angles. This is accomplished by having the portion $ab$ of greater curvature than the curvature of the circle determined by the ends of the teeth of the internal gear 10, and by having the portion $cd$ of lesser curvature than that of the cylinder determined by the ends of the teeth of the external gear 12. These portions $ab$ and $cd$ constitute relatively long, flat, leaf springs connecting 34 and 36 to the relatively stiff hinge portion represented by the part between lines $a$ and $c$.

If the spring is to be used on a pump rotating in the direction opposite to the arrow in Fig. 1, hinge 40 is joined to member 36 by a portion $ef$ which is similar in purpose and conformation to $cd$.

The partition 33 is floatingly anchored between the gears, for example by a tab 44 which projects laterally beyond the edges of the partition and is placed in a blind hole 46 drilled in the pump body. The diameter of the hole is sufficiently greater than the width of the tab to allow slight circumferential movement between the partition and the casing to facilitate accurate seating of the arcuate members against the gears. For example, when the pump is first assembled it is possible that the centers of curvature of the members 34 and 36 may not coincide exactly with the centers of the gears. The floating anchor arrangement permits the partition to shift in the casing as the gears are first turned, and snugly fit the gears if it is originally off center. Preferably, a notch 48 of large radius is formed in the corner where the tab joins the edge of the strip to prevent cracking and to eliminate need for chamfering the edge of hole 46.

The structure described is one example of the invention. Other embodiments of the invention and in particular other forms of toothed pumping members may be made within the scope of the accompanying claims.

I claim:

1. A pump comprising in combination an internal gear, an external gear meshing with the internal gear and located eccentrically within the internal gear to provide a generally crescent shaped space between the gears, means having a pair of surfaces enclosing said gears and defining with the gears a pumping space, a resilient deformable partition dividing the pumping space into intake and pressure delivery chambers, the partition extending between and being in contact with the surfaces and extending between and being in contact with the ends of teeth on both gears, and anchoring means secured to the partition and extending laterally beyond one of said surfaces for positioning the partition, said anchoring means being adapted to permit relative circumferential movement between the partition and the gears.

2. A pump comprising in combination an internal gear, an external gear meshing with the internal gear and located eccentrically within the internal gear to provide a generally crescent shaped space between the gears, means having surfaces enclosing the gears and defining with the gears a pumping space, and a partition separating said space into an intake chamber and a pressure delivery chamber, said partition including a first arcuate member substantially fitting the internal gear, and a second arcuate member substantially fitting the external gear, one end of the second member being pivoted to the first member, the partition including resilient means at each end of the second member urging the members apart.

3. A pump comprising in combination an internal gear, an external gear meshing with the internal gear and located eccentrically within the internal gear to provide a generally crescent shaped space between the gears, means having surfaces enclosing the gears and defining with the gears a pumping space, and a partition separating said space into an intake chamber and a pressure delivery chamber, said partition including a first arcuate member which is flexible and resilient throughout its length substantially fitting the internal gear, and a second arcuate member which is flexible and resilient throughout its length substantially fitting the external gear, one end of the second member being pivoted to the first member, the partition including resilient means urging the members to rotate apart about the pivot, and resilient means at the other end of the second member bearing against the first member between the ends of the first member and urging the members away from each other.

4. A pump comprising in combination an internal gear, an external gear meshing with the internal gear and located eccentrically within the internal gear to provide a generally crescent shaped space between the gears, means having surfaces enclosing the gears and defining with the gears a pumping space, and a partition dividing the space into an intake chamber and a pressure delivery chamber, said partition including an arcuate member substantially fitting the internal gear and a second arcuate member substantially fitting the external gear, the second member being formed of a flexible elastic strip normally disposed in a cylindrical surface of lesser curvature than the cylindrical surface determined by the ends of the teeth of the external gear, the pump including means constantly urging the strip against the external gear and into conformity with the curvature of the external gear.

5. A pump comprising in combination an internal gear, an external gear meshing with the internal gear and located eccentrically within the internal gear to provide a generally crescent-shaped space between the gears, means having surfaces enclosing the gears and defining with the gears a pumping space, and a partition dividing the space into an intake chamber and a pressure delivery chamber, said partition including an arcuate member substantially fitting the internal gear and a second arcuate member substantially fitting the external gear, the first member being formed of a flexible elastic strip normally disposed in a cylindrical surface of greater curvature than the cylindrical surface determined by the ends of the teeth of the internal gear, the pump including means constantly urging the strip against the internal gear and into conformity with the curvature of the internal gear.

6. A pump comprising in combination an internal gear, an external gear meshing with the internal gear and located eccentrically within the internal gear to provide a generally crescent-shaped space between the gears and a continuous elastic flexible strip dividing the space into an intake chamber and a pressure delivery chamber, the strip being formed into a first arcuate member substantially fitting the internal gear, a resilient pivotal connection joining said arcuate member to one end of a second arcuate member substantially fitting the external gear, and a leaf spring connected to the other end of the second member and bearing against the first member between its ends.

7. A pump comprising in combination an internal gear, an external gear meshing with the internal gear and located eccentrically within the internal gear to provide a generally crescent shaped space between the gears, means having surfaces enclosing the gears and defining with the gears a pumping space, and a continuous elastic flexible strip dividing the space into an intake chamber and a pressure delivery chamber, the strip being formed into a first arcuate member having a curvature greater than the curvature of the cylinder determined by the ends of the teeth of the internal gear, a resilient pivotal connection joining said arcuate member to one end of a second arcuate member having a curvature less than the curvature of the cylinder determined by the ends of the teeth of the external gear, and a leaf spring connected to the other end of the second member and bearing against the first member between its ends to urge the members resiliently into conformity to the curvature of both gears.

8. A pump comprising in combination a casing enclosing a pumping space, a rotatable, substantially rigid member having spaced projections extending radially inwardly therefrom, the projections being moved through the pumping space when the member is rotated, and a partition adapted to contact the ends of a plurality of the projections to divide the pumping space into intake and pressure delivery chambers and forming with the projections a plurality of fluid-carrying pockets in each chamber, said partition including an elastic, flexible, arcuate member which in repose has a curvature greater than the curvature of the path of the ends of the projections, and means for resiliently urging the arcuate member at spaced points to bend into contact with the rotatable member.

References Cited in the file of this patent

UNITED STATES PATENTS

| | | |
|---|---|---|
| 763,525 | Van Beresteyn | June 28, 1904 |
| 1,646,615 | Furness | Oct. 25, 1927 |
| 1,904,284 | Fagan et al. | Apr. 18, 1933 |
| 1,982,027 | Sieper | Nov. 27, 1934 |
| 2,482,713 | Jones | Sept. 20, 1949 |
| 2,697,987 | Barclay | Dec. 28, 1954 |
| 2,742,862 | Banker | Apr. 24, 1956 |
| 2,745,355 | Mosbacher | May 15, 1956 |

OTHER REFERENCES

| | | |
|---|---|---|
| 162,233 | Switzerland | Aug. 16, 1933 |
| 173,029 | Switzerland | Feb. 1, 1935 |
| 594,214 | Great Britain | Nov. 5, 1947 |